United States Patent [19]

Giordano et al.

[11] Patent Number: 5,151,180
[45] Date of Patent: Sep. 29, 1992

[54] RADIAL AND AXIAL FLOW STAGE FILTER DEVICE

[75] Inventors: Edward C. Giordano; Mark O'Brien, both of Glastonbury; Raymond M. Petrucci, Middlebury; Bruce G. Taylor, Kensington, all of Conn.

[73] Assignee: Cuno, Incorporated, Meriden, Conn.

[21] Appl. No.: 599,227

[22] Filed: Oct. 16, 1990

Related U.S. Application Data

[63] Continuation-in-part of Ser. No. 422,519, Oct. 17, 1989.

[51] Int. Cl.⁵ .............................................. B01D 25/02
[52] U.S. Cl. ..................... 210/264; 210/315; 210/321.88; 210/487; 210/495.4; 210/497.1
[58] Field of Search .............. 210/263, 264, 282, 284, 210/321.78, 321.87, 321.88, 314, 315, 476, 486, 487, 493.4, 497.1

[56] References Cited

U.S. PATENT DOCUMENTS

| D. 162,118 | 2/1951 | Bausenbach | D58/1 |
|---|---|---|---|
| D. 212,417 | 10/1968 | Glover, Jr. | D23/3 |
| D. 215,000 | 8/1969 | Young | D23/3 |
| D. 253,422 | 11/1979 | Smith | D23/4 |
| D. 282,561 | 2/1986 | Lu | D23/3 |
| 2,766,890 | 10/1956 | Kasten | 210/183 |
| 2,960,234 | 11/1960 | Fredrickson | 210/457 |
| 3,105,042 | 9/1963 | Roosa | 210/94 |
| 3,132,501 | 5/1964 | Jacobs et al. | 68/18 |
| 3,144,407 | 8/1964 | Olmos | 210/307 |
| 3,390,778 | 7/1968 | Uhen | 210/314 |
| 3,465,883 | 9/1969 | Jumper | 210/307 |
| 3,561,602 | 2/1971 | Molitor | 210/266 |
| 3,586,171 | 6/1971 | Offer | 210/136 |
| 3,975,273 | 8/1976 | Shaltz et al. | 210/74 |
| 4,070,292 | 1/1978 | Adams | 210/195 |
| 4,094,791 | 6/1978 | Conrad | 210/316 |
| 4,411,791 | 10/1983 | Ward | 210/649 |
| 4,476,019 | 10/1984 | Nowisch et al. | 210/232 |
| 4,711,723 | 12/1987 | Bray | 210/652 |
| 4,753,728 | 6/1988 | VanderBilt et al. | 210/282 |
| 4,828,698 | 5/1989 | Jewell et al. | 210/266 |
| 4,842,724 | 6/1989 | Bray et al. | 210/104 |
| 4,859,386 | 8/1989 | VanderBilt et al. | 264/113 |

FOREIGN PATENT DOCUMENTS 0335571 10/1989 European Pat. Off. .

Primary Examiner—Robert A. Dawson
Assistant Examiner—W. L. Millard
Attorney, Agent, or Firm—Renner, Kenner, Greiver, Bobak, Taylor & Weber

[57] ABSTRACT

A filter device for use in a residential water supply system, or the like. The device includes a container having an enclosed cavity, and includes a filter unit disposed in the cavity. The device includes a two-stage filter having a first radial flow filter subassembly and a second axial flow filter subassembly.

11 Claims, 9 Drawing Sheets

RADIAL AND AXIAL FLOW STAGE FILTER DEVICE

RELATED APPLICATIONS

This application is a continuation-in-part of U.S. Ser. No. 07/422,519 filed Oct. 17, 1989, which is pending, the entire disclosure of which is incorporated herein by reference.

This invention relates to a filter device, and in particular, a two-stage filter device having a first radial flow filter stage and a nested second axial flow hollow fiber filter stage with serial fluid flow passages therebetween.

BACKGROUND OF THE INVENTION

1. Field of the Invention

A prior art filter device is described in U.S. Pat. No. 3,390,778, to Uhen. This filter device includes a container having an inlet opening and an outlet opening and includes a filter unit having a first stage radial flow filter subassembly and having a second stage radial flow filter subassembly. A problem associated with this filter device is that the fluid flow has a relatively excessive number of turns for fluid flow from the inlet opening to the outlet opening, with a resultant head loss.

Other relevant U.S. patents are:

| INVENTOR | U.S. Pat. No. |
|---|---|
| Kasten | 2,766,890 |
| Fredrickson | 2,960,234 |
| Roosa | 3,105,042 |
| Jacobs, et al. | 3,132,501 |
| Olmos | 3,144,407 |
| Jumper | 3,465,883 |
| Molitor | 3,561,602 |
| Offer | 3,586,171 |
| Shaltz, et al. | 3,975,273 |
| Conrad | 4,094,791 |
| Jewell et al. | 4,828,698 |
| VanderBilt, et al | 4,859,386 |

Kasten, U.S. Pat. No. 2,766,890, teaches a two-stage fluid demulsifier to separate water droplets from an emulsified liquid using pleated cylindrically-shaped filter paper impregnated with a resinous material to make it resistant to water, gasoline or kerosene and the like, and a fine fibrous mass of material such as fiberglass contained between a perforated metal or wire screen. In operation, the fluid passes radially through both filters. Contaminant seeps downwardly into a contaminant chamber, to be withdrawn from the filter through an outlet. The filter chambers are separated by an annular partition held by bolts. Purified liquid passes upwardly and exits through the outlet.

Fredrickson, U.S. Pat. No. 2,960,234, teaches a two-stage water separator. The second stage of the separator has a cartridge which has a pervious cylindrical wall which provides support for an external paper separator sheet with puckers throughout which approximately double the amount of paper in a given area. The first compartment has a coalescer cartridge. The compartments are separated by a partition or wall. Flow is radial, i.e., from the outside-in, for each cartridge.

Roosa, U.S. Pat. No. 3,105,042, teaches a two-stage liquid fuel filter assembly. In FIG. 4, two identical filter cartridges are axially stacked, each filter having an appropriate filter material, such as a wound cotton cord type. In operation, fluid flows downwardly through the center passageway and then through the lower filter cartridge and then up through the upper filter cartridge and out. In FIG. 5, the lower filter cartridge is a radial flow type filter. In operation, fluid flows downwardly through the central passageway and proceeds radially through the lower filter, then upwardly through a large central opening and then flows through the upper filter cartridge. The filter cartridges of the assembly are not replaceable.

Jacobs, et al., U.S. Pat. No. 3,132,501, shows in FIG. 5 a dry-cleaning filter assembly having replaceable filter cartridges having a first felt filter stage for removing particulate matter from a drycleaning solvent, and a second annular carbon filter for adsorbing dyes and a third annular folded cellulosic filter. As shown by the fluid flow arrows of FIG. 5, fluid passes in through conduit 94, flows downwardly then radially through first filter stage and flows into chamber 160,162 and radially through the second and third filter stage and through opening 168 and out. The filter elements are removable.

Olmos, U.S. Pat. No. 3,144,407, teaches a separator for removing moisture from gasoline, and other hydrocarbon liquids, having a first filter cartridge with an outer annular pleated filter paper element and an inner soft batt formed of glass fibers and a second filter cartridge with cylindrical pleated paper coated with phenol formaldehyde to stiffen the paper and silicone to make it water repellant. The filter cartridges are removably secured in the housing. In operation, fluid flows down a center pipe and then radially through the first filter, upwardly and then radially through the second filter and out.

Jumper, U.S. Pat. No. 3,465,883, teaches a two-stage fuel water separator and filter, having a first coalescer (FIG. 2) composed of hydrophilic material, e.g. fiberglass and molded into a ring shape and a second separator (FIG. 3) composed of treated filter paper. In operation, fuel passes and flows radially through the coalescer, downwardly through a passageway, and flows radially through the separator and passes out.

Molitor, U.S. Pat. No. 3,561,602, teaches a liquid filter, having a first filter element composed of a stack of absorbent cloth discs as shown (FIG. 3) which are saturated with potassium permanganate for dissolving and removing iron from the water, and a second charcoal granular filter for removing odors and the like from the water. In operation, water flows into supply pipe 14 into a lower cylindrical chamber, flows radially through the first filter and then through slots of the central tube, upwardly through the tube and axially through the charcoal filter and out. When the potassium permanganate supply in the first filter becomes exhausted, the filter elements may be replaced with a new element, or the disc filter elements may be re-impregnated by adding an amount of potassium permanganate.

Offer, U.S. Pat. No. 3,586,171, teaches a dual-flow, two-stage oil filter. A filter element is a depth-type filter made from viscose rayon or other synthetic fiber coated with resin and bonded together by heating and curing in a compression mold. A second filter element is made from a fine flow paper. In operation, oil flows radially through both filter elements, with the first filter element excluding particles above 80 microns in size and the second filter element excluding particles above 10 microns in size.

Shaltz, et al., U.S. Pat. No. 3,975,273, discloses a two-stage oil filter, having a first depth-type filter media consisting of rayon fibers and a binder and a second surface-type filter media made of spirally wound crepe filter paper. In operation, oil flows in parallel through the filters by passing radially through depth-type filter which removes all solid particles above 90 microns and then through a surface-type filter 30 which removes even smaller solid particles.

Conrad, U.S. Pat. No. 4,094,791, teaches an oil filter, having a main flow filter insert and an auxiliary flow filter insert, removable, and replaceable.

Jewell, et al, U.S. Pat. No. 4,828,698 describes a filter assembly comprising a housing having a liquid inlet and a liquid outlet and defining a liquid flow path between the inlet and the outlet. A generally cylindrical filter arrangement is provided disposed within the housing in the liquid flow path. The filter arrangement comprises a cylindrically shaped porous means for removing particulate contaminants from the liquid, a cylindrically shaped sorbent-containing means for removing chemical contaminants from the liquid, and a cylindrically shaped microporous means for removing microbiological contaminants from the liquid. A means is provided for directing the liquid flow radially through the filter arrangement.

VanderBilt, et al, U.S. Pat. No. 4,859,386 describes a double shell filter including an inner shell of bounded carbon particles and an outer shell of bonded carbon particles wherein the inner and outer particles are bonded internally to each other and the two shells are bonded together preferably by an ultra high molecular weight polymer binder. The outer charcoal layer is covered by fabric and fabric scrim which are held in place by plastic net wrap.

SUMMARY OF THE INVENTION

According to the present invention, a filter device is provided. This filter device comprises a container having a longitudinal axis, a peripheral wall, a first end wall and a second end wall enclosing a cavity and further having an inlet opening and an outlet opening. A filter unit is disposed in the cavity. The unit comprises a first radial flow filter subassembly and a second axial flow filter subassembly, preferably comprising hollow fibers, nested in the first radial flow filter subassembly, preferably at an end thereof or in the center of the radial flow filter subassembly.

By using a second axial flow filter subassembly nested in a first radial flow filter subassembly, the problem of having a relatively excessive number of turns of the fluid flow, and resulting head loss, is avoided and the device, particularly when the axial flow filter subassembly is nested in the center of radial flow subassembly, is relatively compact.

The foregoing and other objects, features and advantages will be apparent from the following description of the preferred embodiment of the invention as illustrated on the accompanying drawings.

DESCRIPTION OF A PREFERRED EMBODIMENT

Figure 1:
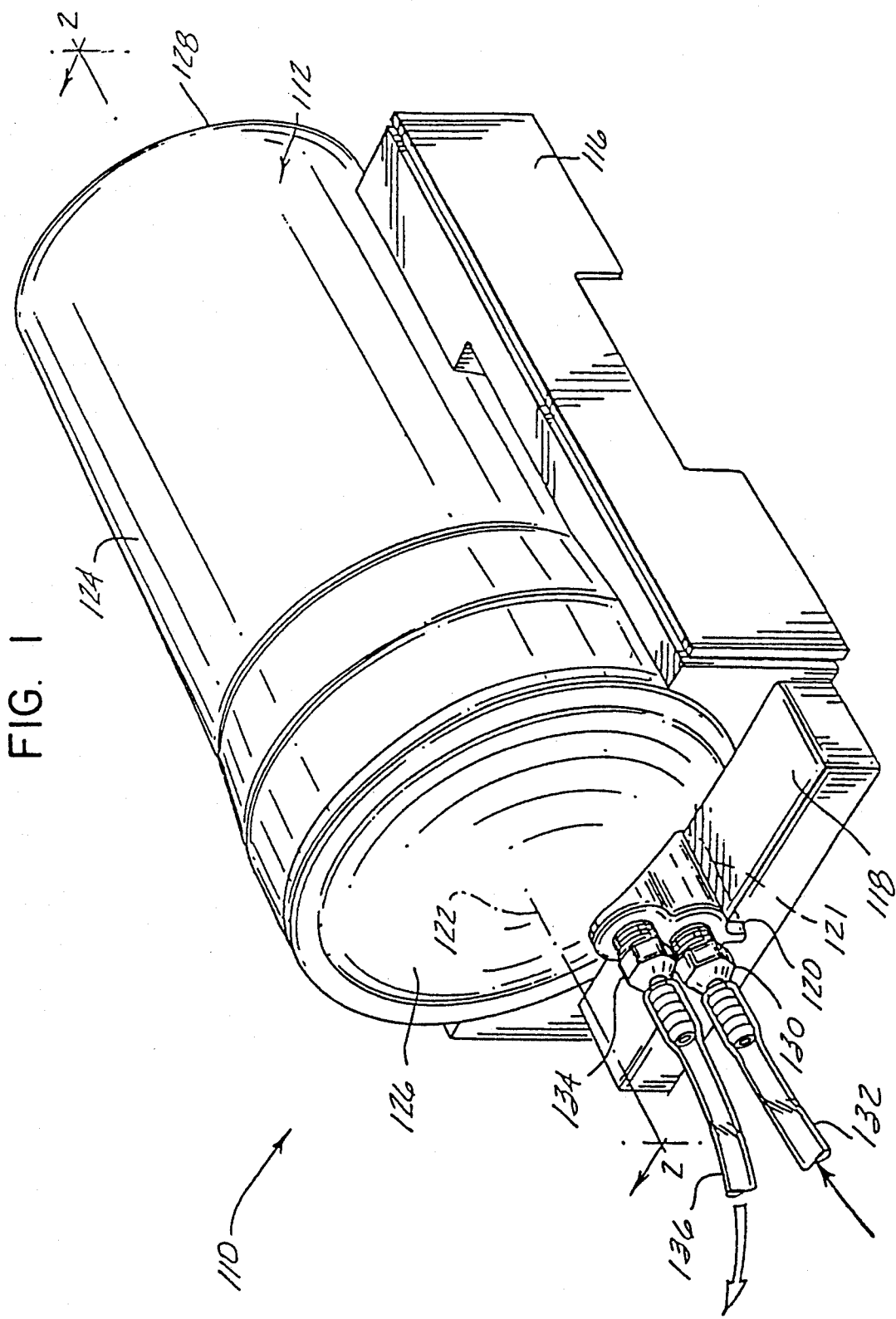
FIG. 1 is a perspective view of an embodiment of the filter device according to the present invention.
Figure 2:
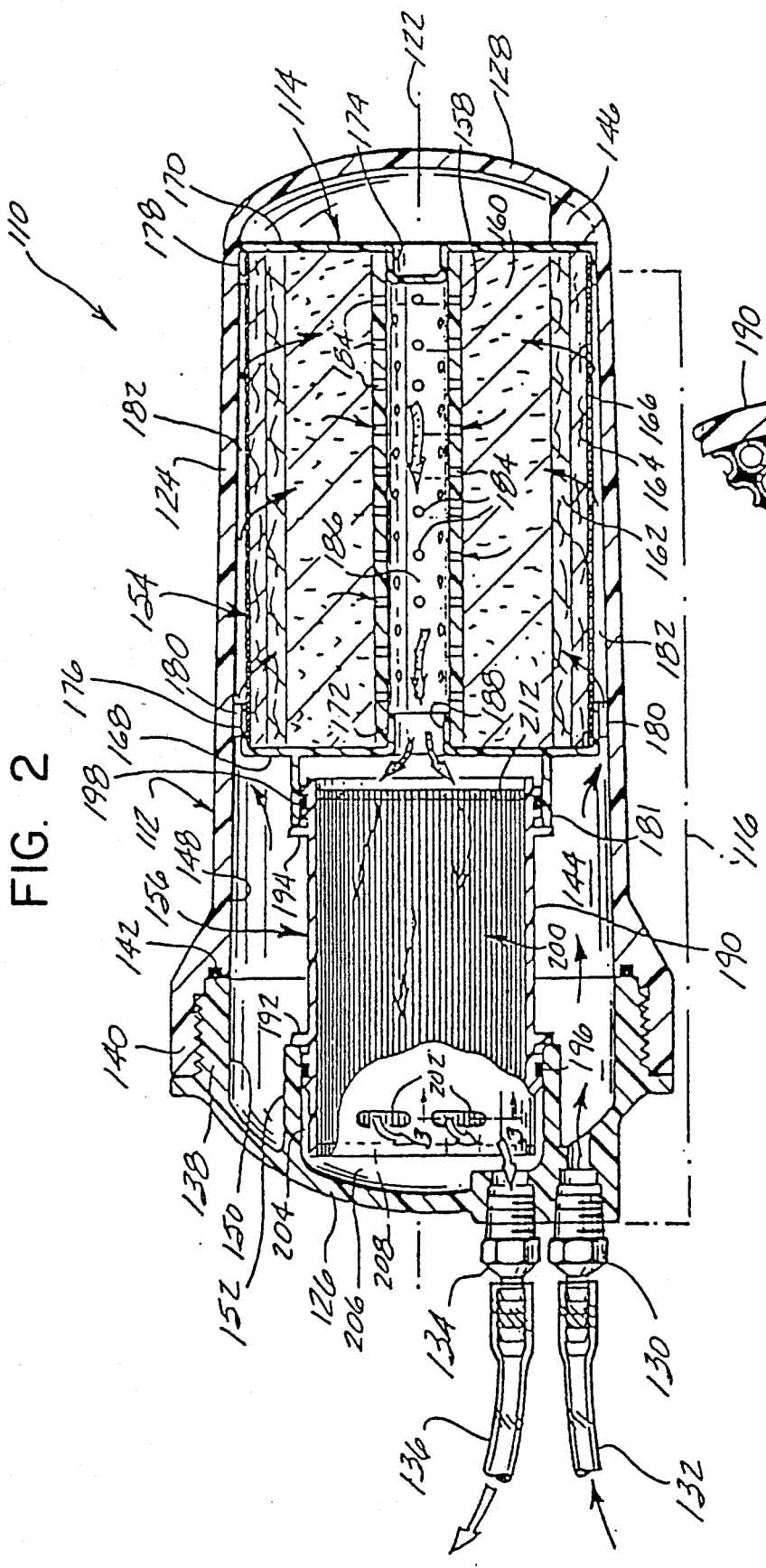
FIG. 2 is a section view as taken along line 2—2 of FIG. 1.
Figure 3:
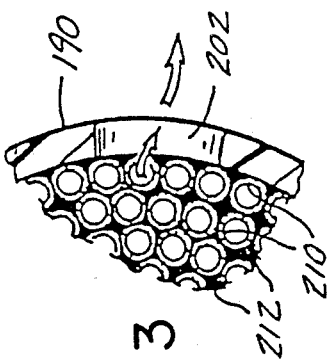
FIG. 3 is a section view as taken along line 3—3 of FIG. 2.

This preferred embodiment is shown in FIGS. 1-3.

As shown in FIGS. 1 and 2, a filter device or apparatus 110 is provided. Device 110 includes a housing or container 112, a filter assembly 114, which is disposed inside container 112, and a cradle structure 116, which supports container 112.

Cradle 116 has an end cross-beam 118, which has a slot 120. Slot 120 receives a projection 121 of container 112 in order to prevent turning of container 112 relative to cradle 116.

Referring to FIG. 2, container 112 has a longitudinal axis 122, and has a peripheral wall 124, a left end wall 126, and a right end wall 128. End walls 126,128 are dome-shaped, and are also axially spaced along axis 122.

Left end wall 126 has an inlet fitting 130, a tube 132 connected to inlet fitting 130, an outlet fitting 134, and a tube 136 connected to outlet fitting 134. Inlet fitting 130 is disposed radially outwardly of outlet fitting 134. Tubes 132 and 136 may be connected to a faucet connector (not shown) which provides inlet flow to the filter device and permits outlet flow.

Left end wall 126 has a threaded projecting portion 138, which projects axially outwardly. Peripheral wall 124 has an oppositely facing threaded projecting portion 140, which receives and is threaded over portion 138. Peripheral wall 124 also has an O-ring or seal ring 142, which is disposed adjacent to threaded portions 138,140, and which bears against peripheral wall 124 and end wall 26 at the ends thereof.

Right end wall 128 is fixedly connected to peripheral wall 124. Walls 124,126,128 enclose a cavity or chamber 144. Right end wall 128 has a step portion 146, which faces chamber 144.

Peripheral wall 124 has a radially inner surface 148. Surface 148 is slightly tapered and has a frusto-conical shape. Threaded portion 138 also has a radially inner surface 150, which lines up and is flush with an adjacent portion of surface 148. Left end wall 126 has a cylindrical extension 152, which projects axially inwardly into chamber 144.

Filter assembly 114, which is a two-piece assembly, is supported in an axial direction by step 146 at one end thereof and by a substantially coaxial cylindrical extension 152 at the other end thereof. Filter assembly 114 is supported in a radial direction by peripheral wall 124 at the right end and by extension 152 at the left end.

Filter assembly 114 includes a first stage radial flow subassembly 154 and a second stage axial flow subassembly 156.

In the embodiment depicted, subassembly 154 includes a carbon block cylinder 160, for reducing organic chemicals, "off tastes" and odors; and a post filter porous sintered polyethylene tube 158, for retaining carbon particles. Radial flow subassembly 154 also includes a heavy metal, e.g., lead (soluble and insoluble) removing prefilter member 162 and 164, and a prefilter porous layer or screen 166 for reducing coarse sediment, both, i.e., 162, 164 and 166 being spirally wrapped about the carbon block cylinder 160.

Carbon filter 160 is disposed radially outwardly of tube 158, prefilters 162 and 164 are disposed radially outwardly of filter 160, and screen 166 is disposed radially outwardly of prefilter 164.

Radial flow subassembly 154 also includes a left solid end cap 168 and a right solid end cap 170. Left end cap 168 has an open inner coaxial cylinder 172. Right end cap 170 has a closed coaxial inner cylinder 174. Cylinders 172,174 support the post filter tube 158. Left end cap 168 also has an outer return bend cylindrical portion 176, which overlaps wrap 166. Right end cap 170 also has an outer return bend cylindrical portion 178, which overlaps wrap 166.

Return bend cylindrical portion 176 has a plurality of peripherally spaced spacers or fins 180, which center left end cap 168, and which allow fluid flow between the fins 180. Left end cap 168 also has a coaxial cylindrical projection 181, which projects axially outwardly and which overlaps and nests axial flow subassembly 156 at an end thereof.

Radial flow subassembly 154 forms an annular space or passage 182 of tapered thickness, for fluid flow radially inwardly through wrap 166, then through prefilters 164,162, then through carbon block filter 160, and then through tube 158. Tube 158 has a plurality of holes 184, for fluid flow through tube 158, then through a passage or space 186 within tube 158. Left end cap 168 has a central hole 188, which is disposed radially inwardly of cylinder 172, for fluid flow from passage 186 then through hole 188 and then through axial flow subassembly 156. The size of holes 184 are exaggerated in the drawing for ease of illustration.

Axial flow subassembly 156 includes an open-ended molded plastic hollow shell element 190. Shell 190 has a left bearing shoulder ring 192 and has a right bearing shoulder ring 194. Shoulders 192 194 project radially outwardly and bear respectively against extension 152 and projection 181.

Shell 190 has a left seal ring or O-ring 196 and has a right seal ring or O-ring 198. Seal rings 196,198 prevent fluid flow to the radially outer side of shell 190 from hole 188. Fluid flow from hole 188 passes only on the radially inner side of shell 190.

Referring to FIGS. 2 and 3, shell 190 contains an axial filter unit 200. Unit 200 is a hollow fiber type of filter unit. Fluid flow passes from hole 188, then through filter unit 200 and then through peripherally spaced slots 202 near the left end thereof.

Shell 190 forms an annular passage or space 204, which is disposed axially outwardly of seal ring 196, for fluid flow through slots 202, then through passage 204, and then through an outlet passage or space 206 to fitting 134 and tube 136.

Filter unit 200 includes a left dead end thin solid wall portion 208, which prevents fluid flow therethrough. Preferably this is a polymeric potting material.

As shown in FIG. 3, filter unit 200 has a plurality of thin porous tubes or hollow cylindrical fibers 210. Fluid flow passes axially through the insides of tubes 210 and through the porous walls thereof. Filter unit 200 also has a right thin partition or header wall 212, through which tubes 210 extend preventing fluid flow around tubes 210. Preferably this is a polymeric potting material which surrounds the ends of tubes 210. Fluid flow passes from inside tubes 210, through the walls thereof to the spaces between tubes 210, then out through slots 202 to passage 204.

Container 112 is preferably composed of a plastic or polymeric material. Post filter 158 is also preferably composed of a polymeric material, such as polyethylene. Filter 160 is composed of a carbon material, preferably activated carbon with a polyolefin binder. Prefilters 162,164 are composed of a lead-removing media. Layer 166 is composed of a screen-like plastic netting, e.g. polypropylene, material. Ring seals 142,196,198 are composed of an elastomeric material. Partition and walls 212 and 208 are composed of a polymeric material. Fibers or tubes 210 are composed of microporous tubes, preferably a hydrophilic polysulfane of about a five-millimeter diameter size potted with polyurethane, although nylon microporous tubes may be used. Cradle 116 is composed of a polymeric structural material.

Referring to FIG. 2, in operation, the fluid or water stream which is indicated by the arrows, flows radially through first filter subassembly 154 to center passage 186, then flows axially through second filter subassembly 156.

Shell 190 and O-ring 196,198 separate and seal off the outer inflow from the inner outflow.

In FIGS. 1, 2 and 3, the arrows indicate the direction of fluid flow. The dark arrows indicate contaminated fluid, beginning at the inlet tube 132, and through filters 164,162,160,158. The dark arrows then turn to white arrows with stipples or stippled hatching. The stippled arrows leave the first filter stage 154 and enter filter 200 of the second filter stage 156. The stippled arrows turn to clear white arrows as the purified fluid flows out through slots 202 and passes out through outlet fitting 134.

Filter subassembly 156 is nested in the end of filter subassembly 158. Subassemblies 156,158 can be replaced or cleaned by disassembling peripheral wall 124 from left end wall 126.

DESCRIPTION OF ANOTHER PREFERRED EMBODIMENT

Another preferred embodiment is depicted in FIGS. 4–13. As shown in FIGS. 4–7, a filter device or apparatus 300 is provided which includes an ornamental and functional cradle enclosure 302, a filter housing 306, disposed inside the enclosure 302, and a filter assembly 304 removably disposed in the housing 306. The cradle enclosure 302 supports housing 306 and includes a detachably mounted cover 310. Cradle enclosure 302 has cross-beams 312, 314 which conform to the outer contour of the filter housing 306 to cradle the housing therein.

A latch mechanism 328 is provided which latches the cover 310 to cradle enclosure 302 to the top thereof, the bottom of cover 310 mating with the lower structure of cradle 302 to completely enclose the filter housing 306, which includes the filter assembly 304, therein.

Figure 4:
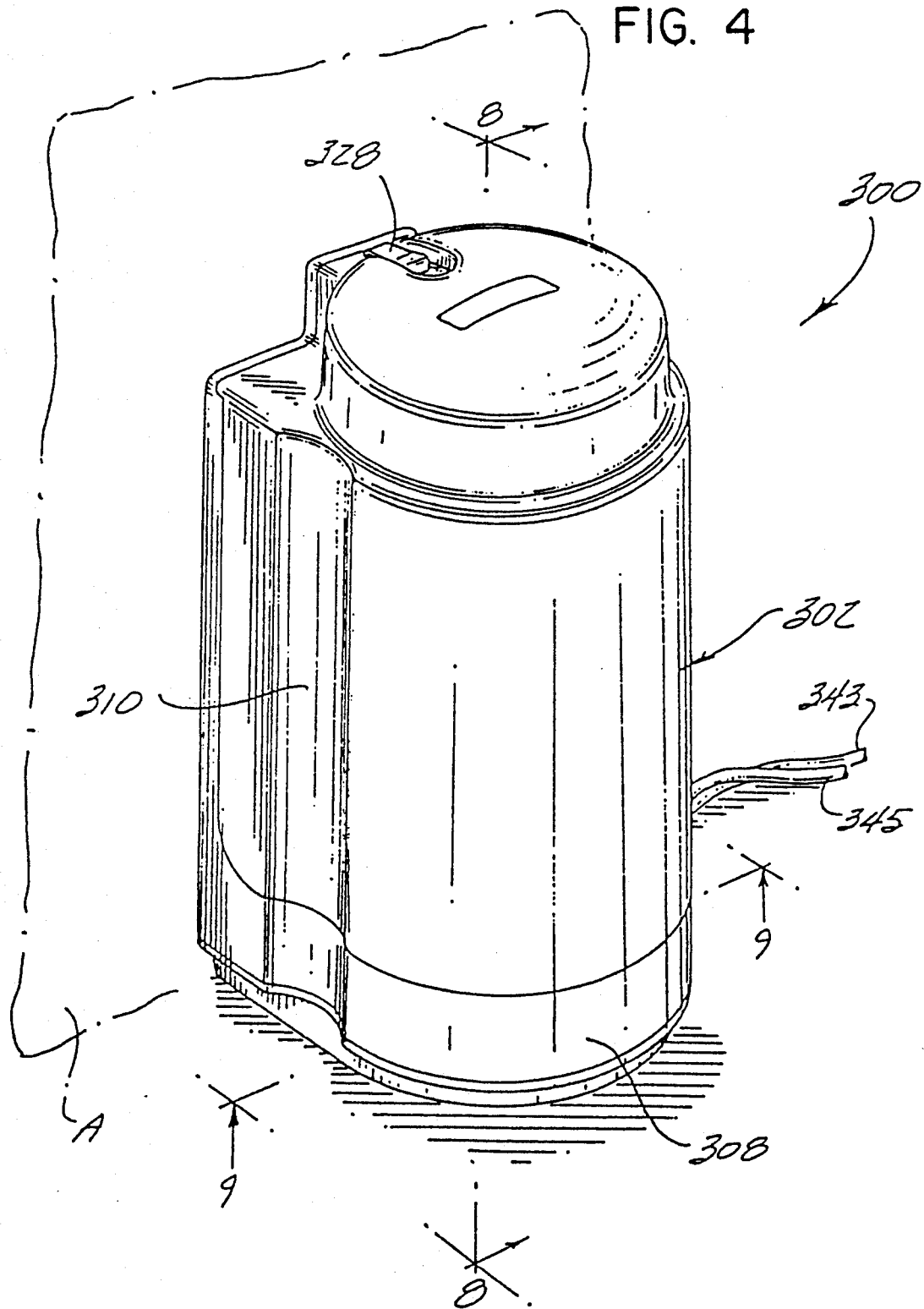
FIG. 4 is a perspective view of another embodiment of the filter device according to the present invention attached to a vertical support structure, e.g. wall, cabinet surface.
Figure 5:
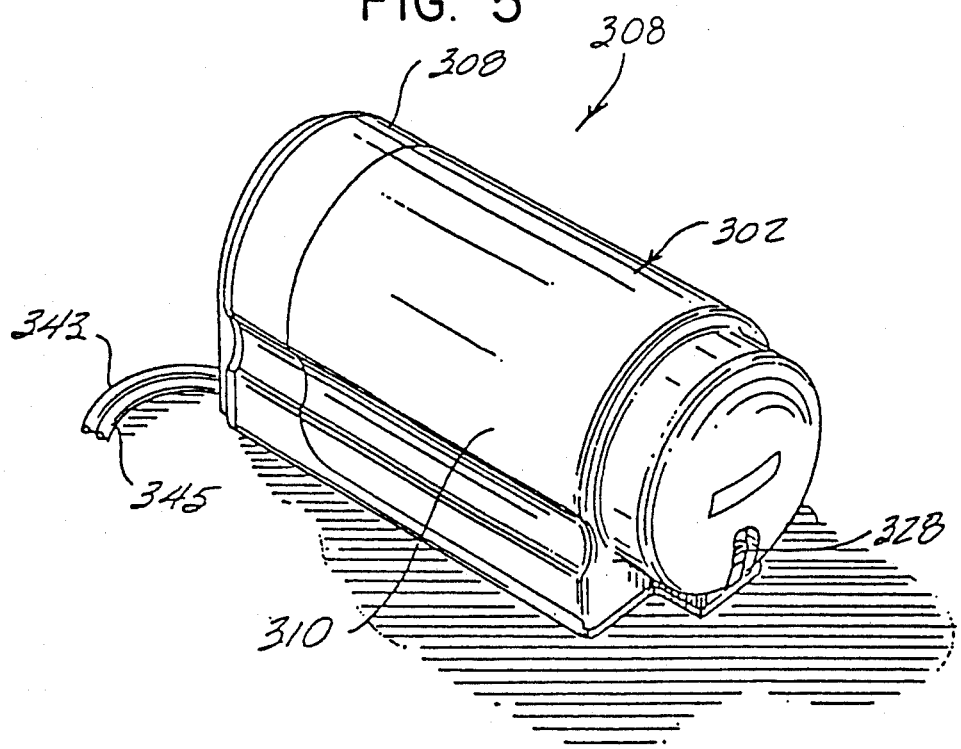
FIG. 5 is another perspective view of the embodiment depicted in FIG. 4.
Figure 6:
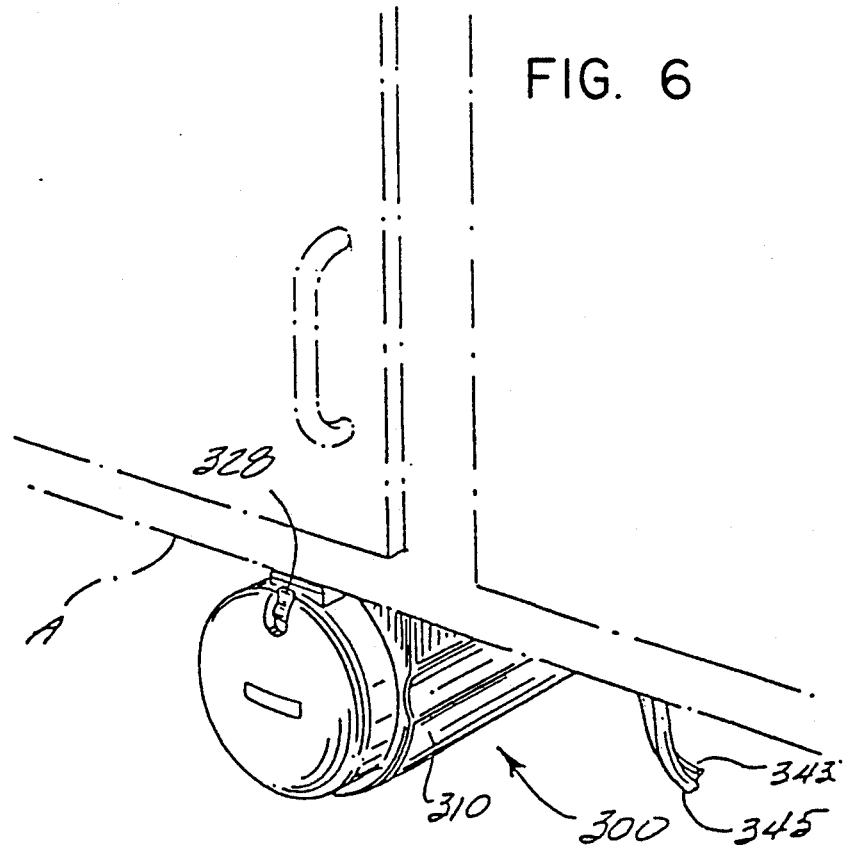
FIG. 6 is another perspective view of the embodiment of FIG. 4 attached to the underside of a cabinet.

Referring to FIGS. 4 s, cradle enclosure 302 may be fastened to a supporting structure A, e.g. a wall, floor, or even the underside of a cabinet. See FIGS. 4, 5 and 6. This may be accomplished, as shown for example in FIG. 8 by providing a plurality of screws 322 which pass through pads 324 located on the base 326 of cradle enclosure 302. Other means may be used to attach the filter device 300 to a supporting structure, for example, adhesives, Velcro strips, etc.

Figure 8:
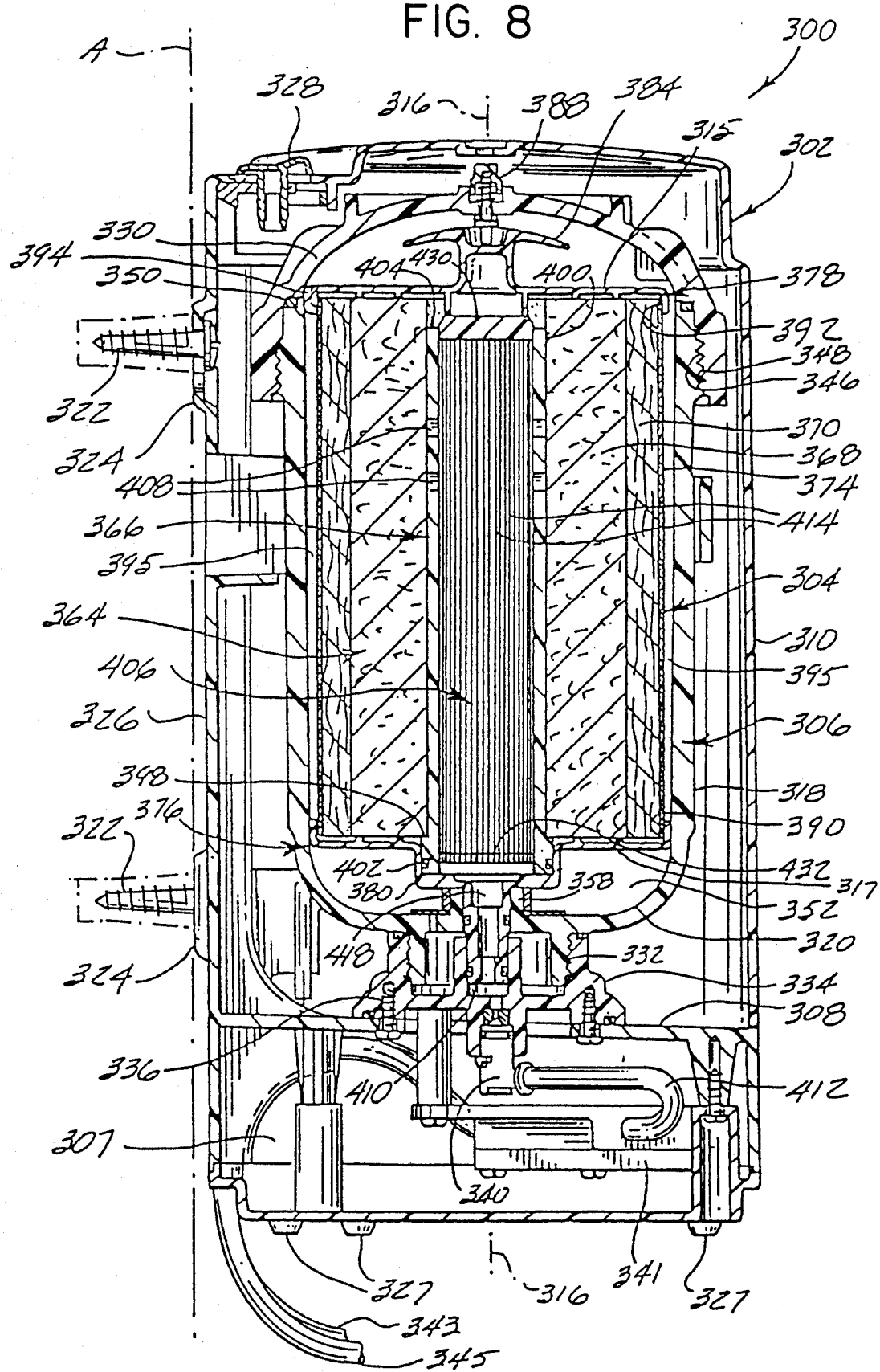
FIG. 8 is a section view of the filter device of FIG. 4 taken along line 8—8 of FIG. 4.

Referring to FIGS. 4 and 8, the device 300 may also be vertically oriented resting on the plurality of pads 327 located on the bottom of the device 300.

Figure 7:
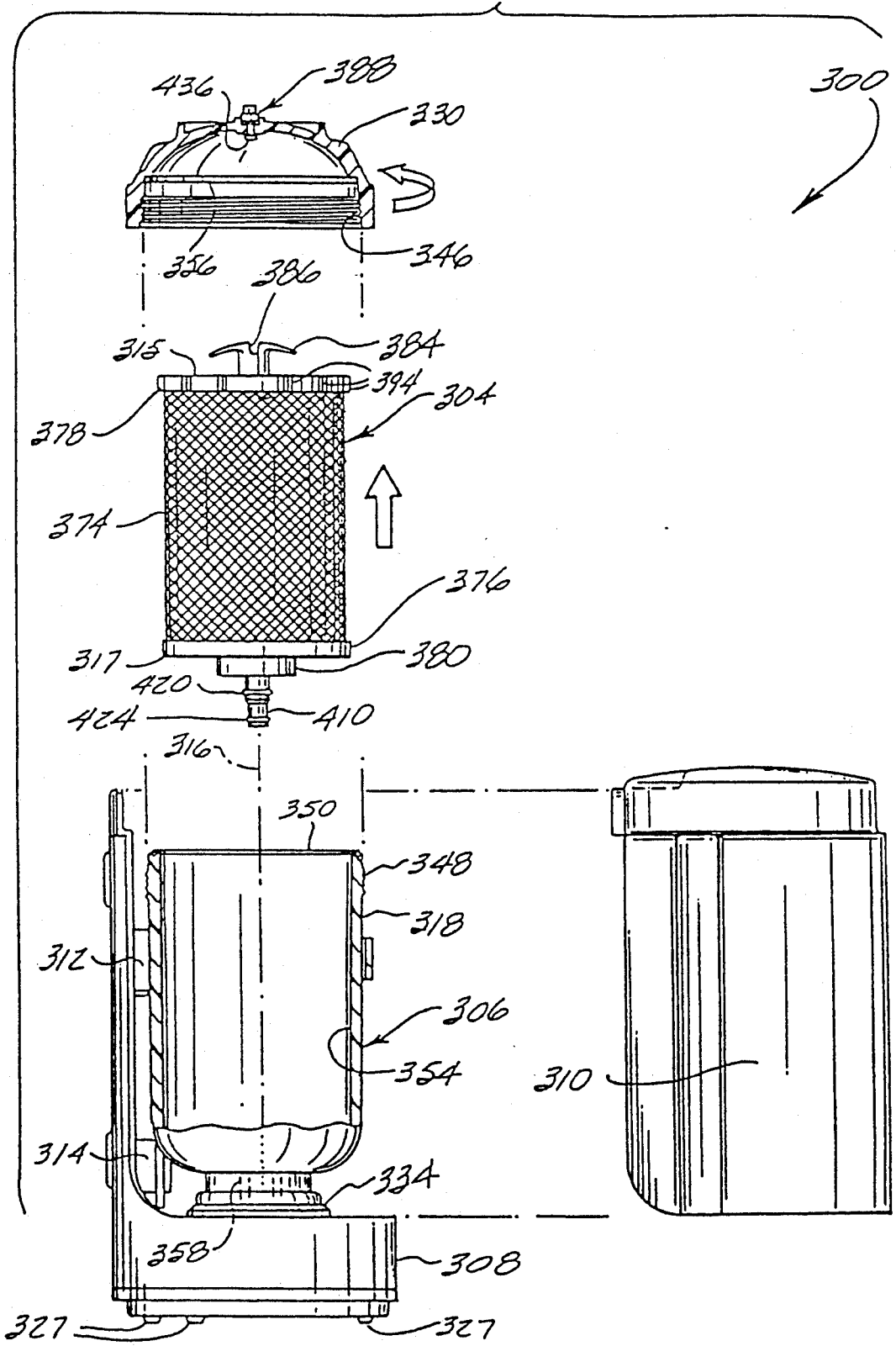
FIG. 7 is an exploded side-elevation view of the embodiment in FIG. 4 wherein the major elements of the filter device are broken away from each other.
Figure 11:
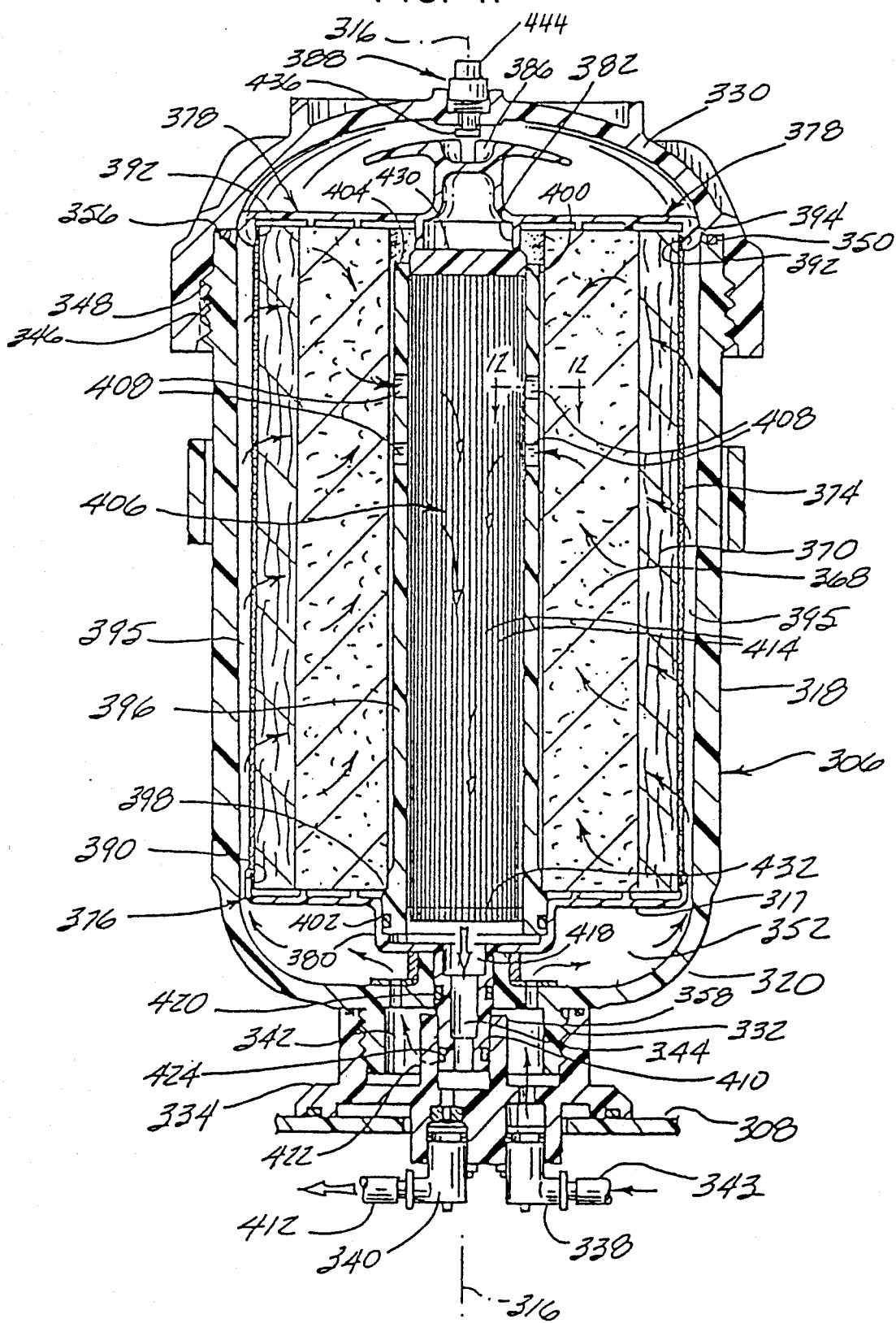
FIG. 11 is a cross-section of the filter assembly of FIG. 9 taken along line 11—11 thereof showing fluid flow through the assembly.

Referring to FIGS. 7, 8, and 11, filter device 300 has a longitudinal axis 316. The filter housing 306 therein has a peripheral wall 318, a lower end wall 320, and an upper end wall 330. End walls 320, 330 are dome-shaped, and are axially spaced along longitudinal axis 316. Lower end wall 320 is fixedly connected to peripheral wall 318. Walls 320, 330, and 318 enclose an interior cavity or chamber 352.

Referring, in particular to FIGS. 8 and 11 lower end wall 320 has a neck extension 332 threadably mounted to connecting head or flange member 334. Flange member 334 is mounted by screws 336 to the base 308 of cradle structure 302. Connected to the underside of base 308 are inlet and outlet fittings 338 and 340, respectively. The inlet fitting 338 is connected to inlet port 342 which is in fluid communication with the interior chamber 352 of filter housing 306 and with the exterior of filter assembly 304. Extending from the center of filter assembly 304 is a nipple 410 which is in fluid connection with the outlet port 344.

Figure 9:
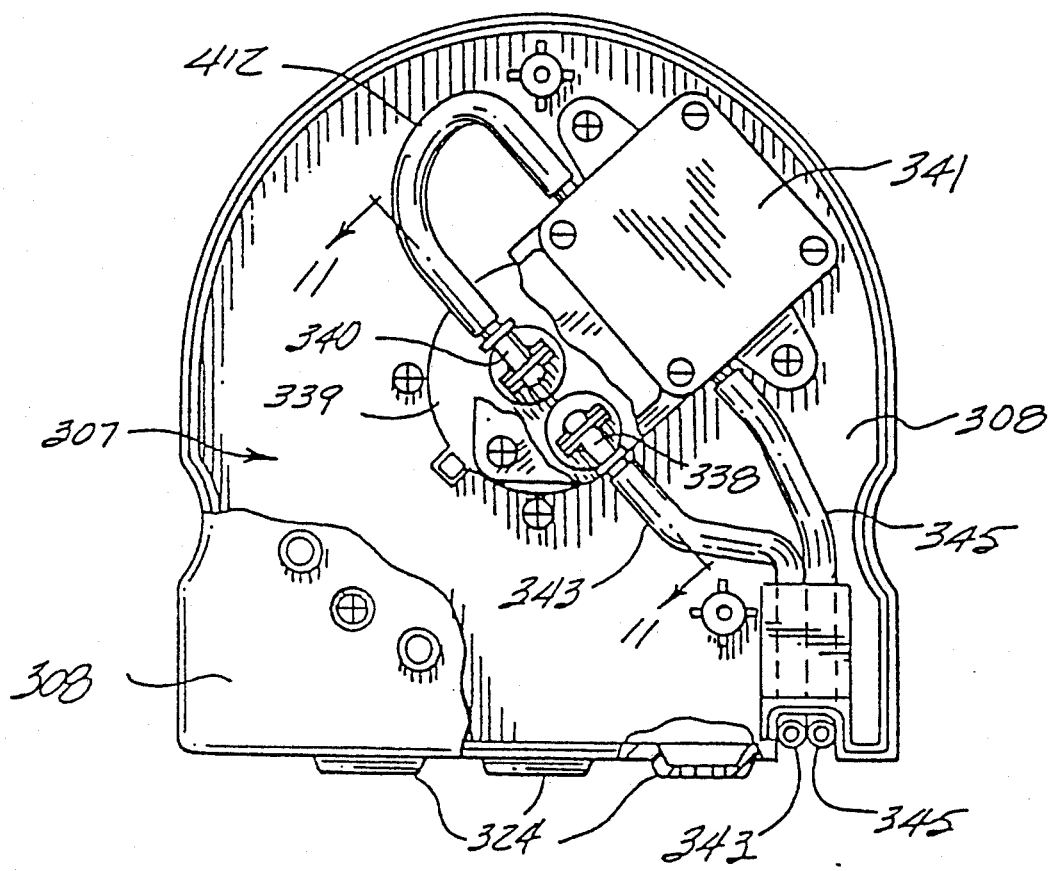
FIG. 9 is a view of the embodiment of FIG. 4 taken along line 9—9 of FIG. 4.
Figure 10:
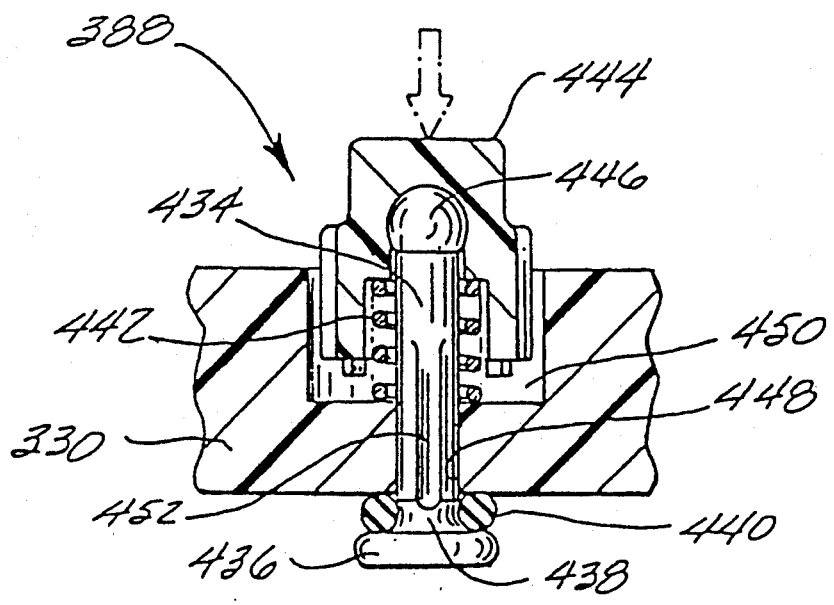
FIG. 10 is a cross-section of the vent at the top of the filter housing (See FIGS. 8 and 11)

Referring to FIG. 9, the lower chamber 307 under the support base 308 contains an electronic flow monitoring device 339, a flow regulator 341, and inlet and outlet connecting tubing 343, 345 respectively which are connected to a faucet diverter (not shown).

Referring to FIGS. 7, 8, and 11, upper end wall 330 has a threaded projecting portion 346, which projects axially inwardly. Peripheral wall 318 has an oppositely facing threaded projecting portion 348, which is received in and is threaded into portion 346. Peripheral wall 318 has a radially inner surface 354. Threaded portion 346 also has a radially inner surface 356, which lines up and is flush with an adjacent portion of surface 354. Peripheral wall 318 also has an O-ring or seal ring 350, which is disposed adjacent to threaded portions 346, 348, and which bears against peripheral wall 318 and end wall 33 at the ends thereof to provide a seal between the interior chamber 352 and the exterior of the filter housing 306.

Lower end wall 320 has a coaxial cylindrical extension 358, which projects axially inwardly into interior chamber 35 into which nipple 410 matingly fits.

Filter assembly 304, which is a two-piece assembly, is supported and axially centered in filter housing 306 by the radial inner surface of the upper end wall 330 at the upper end 315 of assembly 304 and by neck extensions 358 and 380 at the lower end 317 thereof.

Referring to FIGS. 8 and 11, filter assembly 304 includes a first stage radial flow subassembly 364 and, nested in the center thereof, a second stage axial flow subassembly 366.

In the embodiment depicted, radial flow subassembly 364 includes a carbon block cylinder 368, for reducing organic chemicals, "off tastes" and odors; an inner heavy metal, e.g., lead (soluble and insoluble) removing prefilter layer 370 which is spirally wrapped around carbon block 368; and a prefilter porous layer or screen 374 spirally wrapped around layer 370 for reducing coarse sediment.

Carbon block filter 368 is disposed radially outwardly of the axial flow subassembly 366 nested in the center thereof. The heavy metal removing prefilter 370 is disposed radially outwardly of carbon block filter 368 and prefilter screen 374 is disposed radially outwardly of the heavy metal removing prefilter 370.

Referring to FIGS. 7, 8, and 11, radial flow subassembly 364 includes a lower end cap 376 and an upper end cap 378. Lower end cap 376 has a centrally located open projecting cylinder 380 having projecting therefrom nipple 410. Upper end cap 378 has a centrally located closed inner cylinder 382 and handle means 384 projecting therefrom. The handle means 384 projects upward from filter assembly 304 to enable a person to grasp and pull the assembly 304 to disengage nipple 410 from housing 306. The handle 384 includes a depression 386 therein to permit actuation of the vent means 388 (discussed below).

Referring to FIGS. 8 and 11, lower end cap 376 has an outer return bend cylindrical portion 390, which overlaps wraps 370, 372 and 374. Upper end cap 378 also has an outer return bend cylindrical portion 392, which overlaps wraps 370, 372, and 374.

The upper outer bend cylindrical portion 390 has a plurality of peripherally spaced spacers or fins 394, which assist in centering the assembly 304.

The annular space or passage 395 is formed between radial flow subassembly 364 and peripheral wall 318. Fluid flows from passage 395, then radially inwardly through prefilter screen 374, then through the heavy metal prefilter layer 370 then through carbon block filter 368 and then directly into and through axial flow subassembly 366.

The axial flow subassembly 366 includes an open-ended molded plastic hollow shell element 396. Shell 396 contains an axial filter unit 406 comprising a hollow fiber type of filter unit having upper and lower end caps 430 and 432, respectively. Shell 396 has a lower bearing shoulder ring 398 and an upper shoulder ring 400. Lower shoulder ring 398 has a lower seal ring or O-ring 402. Seal ring 402 creates a seal between the inner surface of projecting cylinder 380 and shoulder 398. Lower shoulder ring 398 is sealed to lower end cap 432 of axial flow filter unit 406. Upper shoulder 404 is sealed to upper axial flow end cap 430 to thereby seal and separate the fluid in radial flow subassembly 364 from the axial flow subassembly 366.

Shell 396 has a plurality of peripherally spaced slots 408 near the upper end of shell 396. Fluid, after flowing through radial flow subassembly 366, flows through slots 408, then flows axially through axial filter unit 406. Fluid then flows through a nipple 410 to outlet port 344 and tube 412 to the flow regulator 341 to outlet tubing 345. (See FIG. 9).

Nipple 410, projects from cylinder 380 and is in fluid communication with outlet fitting 340, sealingly engages within extension 358 through upper O-ring 420 and sealingly engages within inner flange extension 422 which is within flange 334, through lower O-ring 424.

Axial filter unit 406 includes an upper solid end cap 430, which prevents fluid flow therethrough and forms an upper bearing surface for inner cylinder 382. Preferably end cap 430 is made of a standard potting material Lower end cap 432 of the axial filter unit 406 sealingly engages to the interior surface of hollow shell 396.

Figure 12:
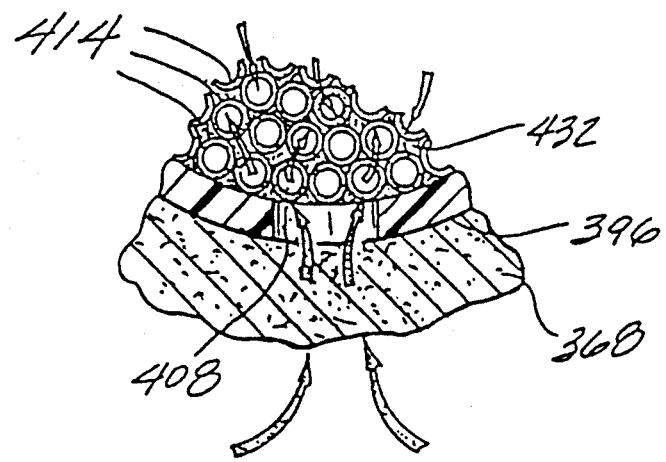
FIG. 12 is an enlarged cross-section taken along line 12—12 of FIG. 11.
Figure 13:
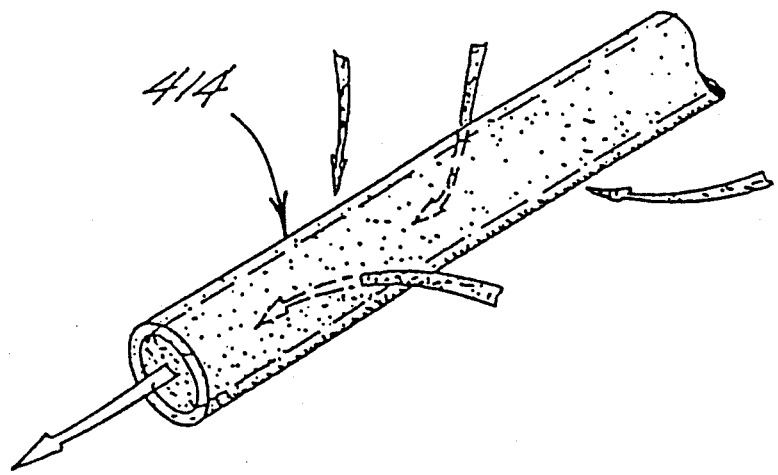
FIG. 13 is a perspective view of a hollow fiber used in the filter assembly of FIG. showing the fluid flow path.

As shown in FIGS. 8, 11–13, axial filter unit 406 has a plurality of porous tubes or hollow cylindrical fibers 414. Fluid flow passes axially through the outside of tubes 414 and through the porous walls thereof. Referring to FIGS. 11–13, the lower end cap 432 of axial filter unit 406 include a thin partition wall through which tubes 414 extend. Preferably the end cap is made of a potting material which surrounds the ends of tubes 414. Fluid flow passes from the spaces between tubes 414, through the walls thereof to the inside of tubes 414, then out through tubes 414 to plenum 418 and thence through nipple 410.

As indicated previously, at the top of the upper end wall 330 there is a vent means 388. This is shown in detail in FIG. 10. Valve stem 434 is slidably maintained in upper end wall 330 in vent hole 448. The lower end of valve stem 434 has a circular head 436 thereon and a groove 438 thereabove in which an O-ring 440 is seated and which sealingly engages the inner surface of the upper end wall 330. Within the upper surface of upper end wall 330 a chamber 450 is provided into which the valve stem 434 projects. A helical spring 442 and button 444 are force fitted onto the enlarged end 446 of valve stem 434. The function of the vent means 388 is to permit the air within in the filter housing 306 to be purged as the housing 306 fills with fluid, e.g. water. The helical spring 442 maintains the vent means 388 normally closed by maintaining pressure between the inside surface of the upper end wall or housing cover 330 and the O-ring 440 located on the circular head 436 of the valve stem 434.

When the user presses down on button 444 of vent means 388 the circular head 436 and O-ring 440 separate from the internal wall of the filter housing 330, thus breaking the seal and allowing air to escape. The button 444 is held down until liquid issues from the vent hole 448 and is then released resealing the vent hole 448.

The valve stem 434 and button 444 are preferably made of a molded plastic. They snap together by providing an expanded head, e.g. cylindrical, on top of stem 434

The valve stem 434 includes an undercut or groove 438 for the O-ring gasket 440 to ensure that it will move away from the wall of the housing 330 and unseal when the button 444 is depressed. Even if the internal pressure in the housing 306 is sufficient to cause the O-ring 440 to come loose from the undercut or groove 438 and drive it up the valve stem 434 toward the vent hole 448, vertical shallow grooves 452 in the valve stem 434 ensure that the air will be allowed to escape and not drive the O-ring up to seal the vent hole 448.. When the button 444 is released the O-ring 440 will automatically return to its original position, resealing the vent hole 448.

As indicated previously the handle means 384 is provided with depression 386 to permit the enlarged end 436 of the valve stem 434 to be depressed below the level of the handle without interfering therewith.

Container 306 is preferably composed of a plastic or polymeric material. Carbon filter 368 is composed of a carbon material, preferably activated carbon with a polyolefin binder. Heavy metal prefilter 370 is composed of a heavy metal, e.g. lead-removing media. Prefilter screen 374 is composed of a screen-like plastic netting, e.g. polypropylene, material. Ring seals 350, 420 and 424 are composed of an elastomeric material. Partition end walls and end cap 416 and 418, respectively are composed of a polymeric material. Fibers or tubes 310 are composed of microporous tubes, preferably hydrophilic polysulfone or nylon microporous membrane, of about a five-millimeter diameter size.

Referring to FIGS. 11–13, in operation, the fluid or water stream which is indicated by the arrows, flows radially through first filter subassembly 364 and then flows axially through second filter subassembly 366.

In FIGS. 11–13, the arrows indicate the direction of fluid flow. Contaminated fluid, beginning at the inlet tube 343, flows sequentially through filters 374, 372, 370, and 368. The fluid leaves the first filter stage, i.e. radial flow subassembly 364, and enters axial filter unit 406 of the second filter stage, i.e. axial flow subassembly 366 through slots 408.

Axial filter subassembly 366 is nested inside radial filter subassembly 364. Subassemblies 366, 364 can be replaced or cleaned by disassembling filter housing 306 by removing housing cover or upper end wall 330 and pulling handle means 384 to disengage the filter assembly 304 from the housing 306. Optionally, the axial flow subassembly 366 may be designed to be removed from the radial flow subassembly 364 for replacement or cleaning.

The heavy metal prefilter is preferably composed of the material described in U.S. Pat. No. 4,908,137 and U.S. Ser. No. 07/447,873 filed Dec. 8, 1989, the entire disclosures of which are incorporated herein by reference.

This invention provides for:

A two-stage filter device which has, in series, a first radial flow filter subassembly and a second axial flow filter subassembly to thereby minimize the number of turns for the fluid flow and resultant head loss;

A two-stage filter device which has filter subassemblies arranged in series, for avoiding parallel fluid flows;

A two-stage filter device which has an inlet and an outlet that are disposed in one end wall for ease of twist-off and disassembly thereof and connection to, for example, a water faucet;

A two-stage filter device which has separate and individual filter subassemblies for replacement of either one or both subassemblies as desired; and A two-stage filter device which has nested first and second filter subassemblies that have a leak-proof, flexureresistant interconnection for ease of support by container end walls.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A filter device comprising, a container having a first end wall and a second end wall spaced and joined by a peripheral wall to enclose a cavity, opening means in said container for fluid inlet means and fluid outlet means, a filter unit supported in said cavity, a radial flow first stage subassembly in said filter unit communicating with said fluid inlet means and disposed for radially inward fluid flow, and an axial flow second stage subassembly in said filter unit disposed centrally within said radial flow first stage subassembly in fluid communication with said radial flow first stage subassembly and said fluid outlet means, thereby providing series fluid flow sequentially through said radial flow first stage subassembly and said axial flow second stage subassembly of said filter unit, said radial flow first stage subassembly having a central axial passage receiving said axial flow second stage subassembly, said axial flow second stage subassembly having a hollow outer shell having slot means therein for fluid flow from said central axial passage of said radial flow first stage subassembly into said axial flow second stage subassembly, and said hollow outer shell of said axial flow second stage subassembly having seal means at the longitudinal extremities engaging said radial flow first stage subassembly for maintaining separation of fluids therein except for fluid flow through said slot means.

2. The filter device of claim 1, wherein said container and said filter unit form an elongate axial flow passage on the radially outer sides of said radial flow first stage subassembly for fluid flow from said fluid inlet means to said radial flow first stage subassembly.

3. The filter device of claim 1, wherein said hollow outer shell of said axial flow second stage subassembly has one open end communicating with said fluid outlet means.

4. The device of claim 1, wherein said flow second stage subassembly has a plurality of porous tubes having one end thereof terminating in an end cap of potting material and having the other end thereof surrounded by a partition wall of potting material through which said tubes extend for communicating with said fluid outlet means.

5. The filter device of claim 1, wherein said opening means includes a neck extension through which said fluid inlet means and said fluid outlet means extend.

6. A filter device comprising, a container having a first end wall and a second end wall spaced and joined by a peripheral wall to enclose a cavity, opening means in said container for fluid inlet means and fluid outlet means, a filter unit supported in said cavity, a radial flow first stage subassembly in said filter unit communicating with said fluid inlet means and disposed for radially inward fluid flow, and an axial flow second stage subassembly in said filter unit disposed centrally within said radial flow first stage subassembly in fluid communication with said radial flow first stage subassembly and said fluid outlet means, thereby providing series fluid flow sequentially through said radial flow first stage subassembly and said axial flow second stage subassembly of said filter unit, said radial flow first stage subassembly having a first end cap with a projecting nipple extending into said opening means in said container and a second end cap having a handle for grasping to position said nipple and said filter unit relative to said container.

7. The filter device of claim 6, wherein a pre-filter screen, a heavy metal pre-filter layer, and a carbon block filter are sequentially radially inwardly disposed between said first end cap and said second end cap.

8. The filter device of claim 7, wherein said first and second end caps have return bend cylindrical portions which overlap said pre-filter screen.

9. The filter device of claim 7, wherein an annular passage is formed between said container, said pre-filter screen, and said second end cap.

10. The filter device of claim 6, including a plurality of fin means on said second end cap for centering said filter unit in said container.

11. The filter device of claim 6, further comprising vent means in said second end wall of said container extending into a chamber formed between said second end wall and said second end cap for purging air within said container upon the initial introduction of fluid through said fluid inlet means.

* * * * *